United States Patent [19]

Hallberg

[11] Patent Number: 4,584,703
[45] Date of Patent: Apr. 22, 1986

[54] CHARACTER RECOGNITION SYSTEM AND ITS USE IN AN OPTICAL DOCUMENT READER

[75] Inventor: Lars O. Hallberg, Lidingo, Sweden

[73] Assignee: International Business Machines Corporation, Armonk, N.Y.

[21] Appl. No.: 450,163

[22] Filed: Dec. 16, 1982

[30] Foreign Application Priority Data

Dec. 23, 1981 [EP] European Pat. Off. ......... 81850252.8

[51] Int. Cl.[4] .................................................. G06K 9/38
[52] U.S. Cl. ...................................... 382/50; 358/282; 382/7
[58] Field of Search ..................... 382/50, 7, 61, 62; 358/282

[56] References Cited

U.S. PATENT DOCUMENTS

| | | | |
|---|---|---|---|
| 3,104,372 | 9/1963 | Rabinow et al. | 382/50 |
| 3,676,847 | 7/1972 | Partin | 340/146.3 |
| 3,715,724 | 2/1973 | Demonte et al. | 382/62 |
| 4,021,777 | 5/1977 | Shepard | 382/61 |
| 4,239,151 | 12/1980 | Enser et al. | 235/437 |
| 4,274,079 | 6/1981 | Todd et al. | 382/61 |
| 4,295,121 | 10/1981 | Enser et al. | 340/146.3 |

FOREIGN PATENT DOCUMENTS

| | | |
|---|---|---|
| 50234 | 4/1982 | European Pat. Off. . |
| 49388 | 4/1982 | European Pat. Off. . |
| 2027962 | 2/1980 | United Kingdom . |

OTHER PUBLICATIONS

J. E. Rohen, "Multi-Code Scanner", IBM Technical Disclosure Bulletin, vol. 23, No. 8, pp. 3613-3614, Jan., 1981.

M. M. Siverling, "Video Thresholding for Character Recognition", IBM Technical Disclosure Bulletin, vol. 17, No. 1, pp. 208-209, Jun., 1974.

Primary Examiner—Leo H. Boudreau
Assistant Examiner—Joseph Mancuso
Attorney, Agent, or Firm—Kenneth A. Seaman

[57] ABSTRACT

A character recognition system comprises a video detector (25) operating with a plurality of threshold signals (V3-V6) in time multiplex mode. Detected video signals are stored in a plurality of storage modules (S3-H S6), one for each time multiplex channel. A signal processor (81) recognizes character data from video data representing a first threshold level (V3) and stored in a first storage module (S3) and subsequently recognizes character data from video data representing a second threshold level (V5) and stored in a second storage module (S3). The system is used in an optical document reader for reading a plural field print line on a document, where the optical characteristics of the various fields are unequal.

3 Claims, 4 Drawing Figures

CHARACTER RECOGNITION SYSTEM AND ITS USE IN AN OPTICAL DOCUMENT READER

BACKGROUND OF THE INVENTION

The present invention relates to a character recognition system for an optical document reader and more specifically to a low cost terminal oriented document reader provided with a low speed character recognition system.

Modern information processing systems often include a plurality of remotely located terminal units attached to a central processing system. An example of such terminal units are cheque readers used in various banking systems. Such readers may be used in large numbers for direct customer service and need therefore to be of low cost type, however, the processing speed is often not critical.

An example of such a banking terminal cheque reader is described in U.S. Pat. No. 4,239,151, issued Dec. 16, 1980 to Enser et al disclosing a low cost low speed magnetic bar code reader system for a CMC7 code. In this system data detected by a read head is stored in a buffer and a slow micro processor is used to recognize characters asynchronously as compared to the read operation.

A similar system for an optical reader used to recognize OCR characters is disclosed in the U.S. Pat. No. 4,447,774 to Edlund et al. In this system the detected video data from the document is buffered in compressed form in a memory for subsequent recognition use. A useful low cost video detector device for such a system is disclosed in the U.S. Pat. No. 4,426,731 (to Stalberg). This video detector device discloses a threshold adjusting system including compensating means for compensating for variations in the read video signals.

In some applications the documents to be read might include two or more fields of different character codes. IBM Technical Disclosure Bulletin Vol. 23, No. 8, Jan. 19, 1981, pages 3613 and 3614 discloses a multicode scanner capable of reading such fields on a document. This scanner comprises a common analog to digital converter and a plurality of parallel computers, one for each code to be recognized. This is a rather expensive system requiring sophisticated circuits for signal detection and processing.

A specific problem encountered in an optical multicode reader where detected signals are buffered before recognition, is the difficulty of applying an appropriate threshold level for each code type. This is especially important if some noise prints such as stamps occur on the code line to be read.

SUMMARY OF THE INVENTION

The invention as claimed is intended to overcome these problems.

An advantage offered by the invention is that a sophisticated character recognition system is provided at low cost.

Another advantage of the invention is that it provides a multicode recognition system in a low speed low cost optical document reader without decreasing the document recognition accuracy.

Still another advantage of the invention is that it provides means in an optical reader for recognizing a plurality of code fields to be scanned with varying threshold signals.

Still another advantage of the present invention is that it enables a one code optical character reader to be rebuilt into a plural code optical character reader with a minimum of circuit changes.

An additional advantage of the present invention is that characters on a document can be detected using a plurality of threshold values for a subsequent multimode character recognition operation.

The invention provides a character recognition system for an optical document reader comprising video signal generating means, threshold signal generating means, signal comparing means for video signal detection, signal storing means and a signal processor, characterized in that said threshold signal generating means comprises means for generating a plurality of threshold signals and that said signal storing means comprises time multiplex channel generating means generating one time multiplex channel for each threshold signal, said channels storing detected video data into a plurality of storage modules, one module for each threshold signal, wherein said signal processor recognizes character data using video data detected with a first threshold signal and stored in a first module and subsequently recognizes character data using video data detected with a second threshold signal and stored in a second module.

BRIEF DESCRIPTION OF THE DRAWINGS

The invention will now be described in detail with reference to the accompanying drawing wherein.

FIG. 1 discloses a document 1 to be scanned in an optical reader according to the present invention. The document 1 is preferably a bank cheque. The cheque 1 contains two fields, a first field 2 with an E13B character code line 4 and a second field 3 with an OCR character code line 6. The two code lines 4 and 6 are separated by a separating field 5 including a separating character X. The E13B code or font line is printed with deep black prints whereas the OCR code or font line 6 contains characters of comparatively weaker printing ink. A stamp 7 in the field 2 is partly extending into the code line 4.

The document 1 is fed into the optical reader in the direction of the arrow 8. The reader reads and detects the characters printed on the code lines starting from the first character of the code line 6, which is an OCR character. The reading is performed by repetitive scans of the code line, such as the scan 9 for the code line 6 and the scan 9' for the code line 4. Such a scan is preferably performed by a line of light emitting diodes and corresponding photo detectors, not shown, energized one after the other when the document passes over the line.

Figure 2:
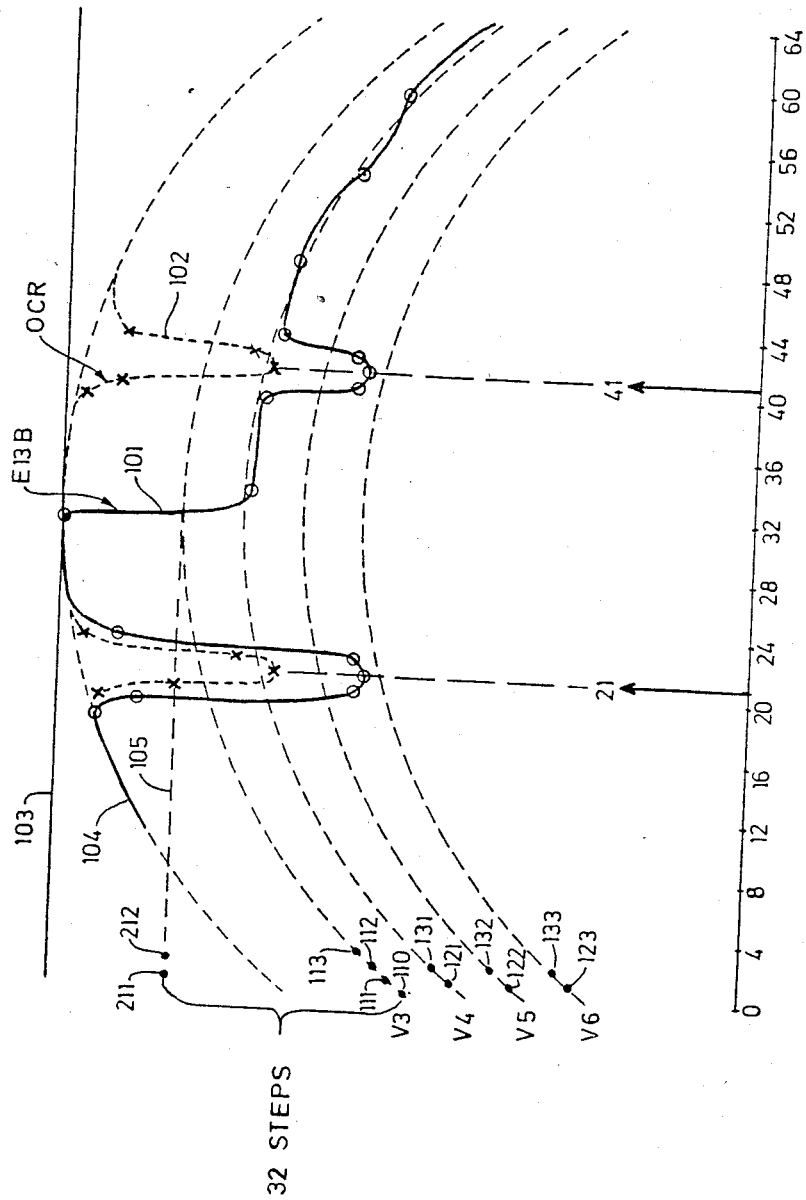
FIG. 2 discloses a diagram of various input video signals where four threshold signal levels are used.

FIG. 2 discloses schematically the result of a line scan. It is assumed that 64 diodes and detectors are used for a scan. The curve 102 indicates the video signal of the line scan 9 for the OCR font and the curve 101 indicates the video signal of the line scan 9' for the E13B font. Four threshold signal levels V3–V6 are used. It can be seen that the threshold level V3 is a preferred level for detecting the black area around the scan points 20-22 and 40-42 for the OCR signal 102. Similarly a threshold value V5 is preferred for detecting black areas between the points 20-22 and 40-42 when a scan 9' is executed for the E13B font.

The rounded shape of the curve 104 including both the curves 102 and 101 is because of the weaker reflecting light intensity at the boarder lines of the code line as compared to the middle of the code line. The white peak signal 103 is generated by the circuit 16.

Figure 1:
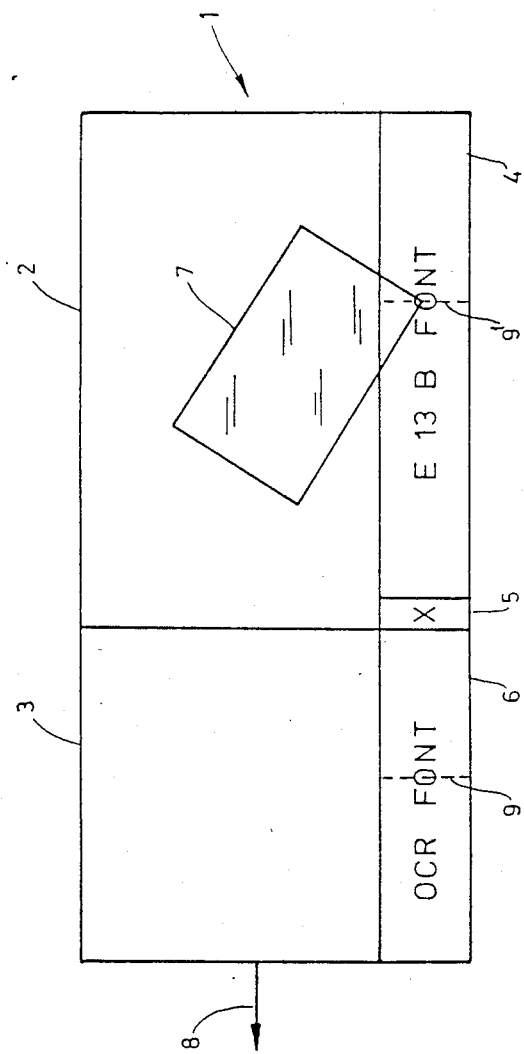
FIG. 1 discloses a document including a dual code line to be recognized according to the present invention.

It can be seen in FIG. 2 that if the higher threshold value V3 would be employed for the E13B font, the noise caused by the stamp 7 in FIG. 1 would be recognized as a black area between the points 32-39. Similarly it can be seen that if the lower threshold value V5 had been used for OCR characters, no black detection would ever have occurred between points 20-22 and 40-42. It is therefore important for the OCR code field 6 to be detected with a threshold value V3 and the E13B code field 4 with a lower threshold value V5. This means that the optical reader should first employ a higher threshold value V3 when reading the OCR code line, then detect the separating character X in the field 5 and switch over to a lower threshold value V5 for detecting the E13B code line 4. The problem is, however, that before the recognition circuits in the reader have recognized the separating character X, the optical read head in the reader might already have scanned several E13B characters with a wrong threshold value. The circuit of FIG. 3 will eliminate such errors.

Figure 3:
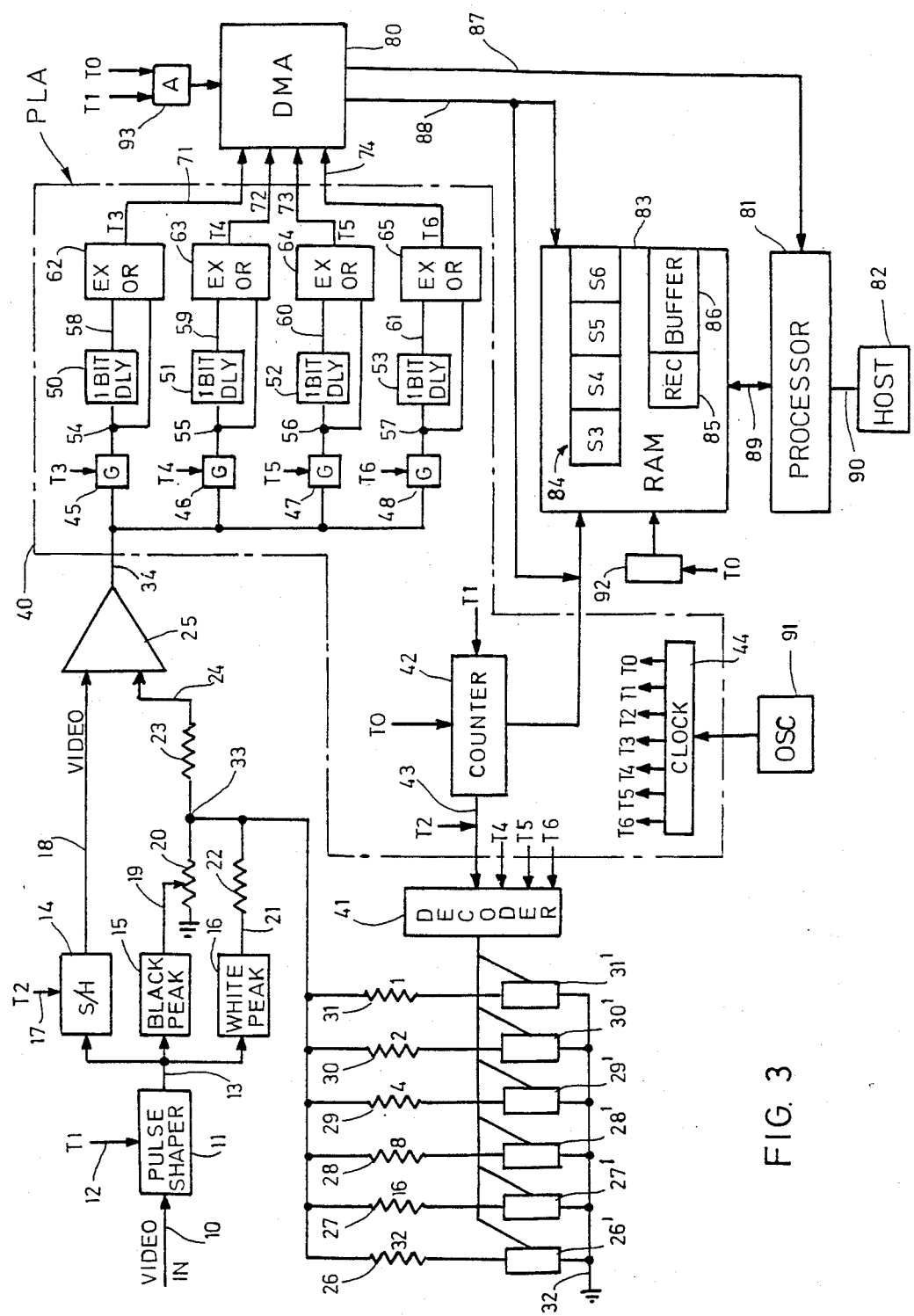
FIG. 3 discloses a circuit diagram according to the present invention.

In FIG. 3, the video signal 10 generated by the read head is applied to a pulse shaper 11. The pulse shaper 11 is controlled by a clock pulse T1 on a clock line 12 from a clock 44 in a program logic array (PLA) circuit 40. The clock 44 in the PLA circuit 40 is driven by an oscillator 91.

The output 13 from the pulse shaper 11 is transferred to a sample and hold circuit 14 controlled by a clock signal T2 on its clock input 17. The output 18 of the sample and hold circuit 14 is transferred as a video signal input to a comparator circuit 25. The other input to the comparator circuit 25 is a threshold input 24 composed of a signal from a black peak detector 15, a white peak detector 16 and a plurality of correction circuit resistors 26-31. The output 13 from the pulse shaper 11 provides an input to both the peak detectors 15 and 16. The output 19 from the black peak detector 15 is attached through an adjustable resistor 20 to a combining resistor 23. The output 21 of the white peak detector 16 is attached through resistor 22 to a common point 33 between the resistors 20 and 23. All the resistors 26-31 are connected in parallel to the common point 33. These resistors 26-31 are each connected by means of a corresponding switch 26'-31' to ground 32. A decoder 41 driven by the PLA circuit 40 controls the switches 26'-31'.

The video detector including the comparator 25 and its signal generating circuits is described in detail in the aforementioned Stalberg U.S. Pat. No. 4,426,731.

The output 34 from the comparator circuit 25 is attached by means of a gate circuit 45 to the input 54 of a one bit delay circuit 50 and an EXCLUSIVE-OR circuit 62. The output 58 of the one bit delay circuit 50 is attached to the second input of the EXCLUSIVE-OR circuit 62. The output 71 of the EXCLUSIVE-OR circuit 62 is attached as an input to a direct memory access circuit (DMA) 80.

It can be seen that a video signal detected by a comparator 25 and sampled at T3 time by the gate circuit 45 will cause a direct memory access operation, i.e. an input signal to the DMA circuit 80, if the previous bit stored in the circuit 50 is unequal to the present bit sampled by the gate circuit 45. Such a DMA request will initate over the line 88 the transfer of the contents of a counter 42 in the PLA circuit 40 to a random access memory (RAM) 83. The counter 42 will be stepped by timing signals T1, one step for each scanning point during a scan. This means according to the example shown in FIG. 2 that the counter 42 will be stepped from 0 to 64 during a complete scan.

The RAM 83 will accordingly store the scanning point information for each change of the output of the video detector 25. This means that information will be stored in the RAM 83 when changes are detected for the video signal from white to black and from black to white. Hence detected video information is stored as compressed data in RAM 83. It is then possible for a processor 81, preferably a microprocessor, attached to the RAM 83 over a channel 89, to recognize characters from this stored information. The use of the DMA circuit 80, the counter 42, the RAM 83 and the processor 81 is more fully described in the aforementioned Edlund et al. U.S. Pat. No. 4,447,774.

The storing of video data in the memory 83 is asynchronous as compared to the recognition process performed by the processor 81. The DMA circuit 80 interrupts via an interrupt line 87 the operation of the processor 81 when a memory cycle is to occur. The processor 81 may be attached over a channel 90 to a host 82 or to a communication link.

In addition to the above described conventional video signal detection and character recognition operation, the circuit of FIG. 3 can also be used for detecting and recognizing characters of different print quality on a document requiring different threshold values to be used. This is accomplished by detecting the video signal in time multiplex mode and varying the threshold signal for each time multiplex channel.

Figure 4:
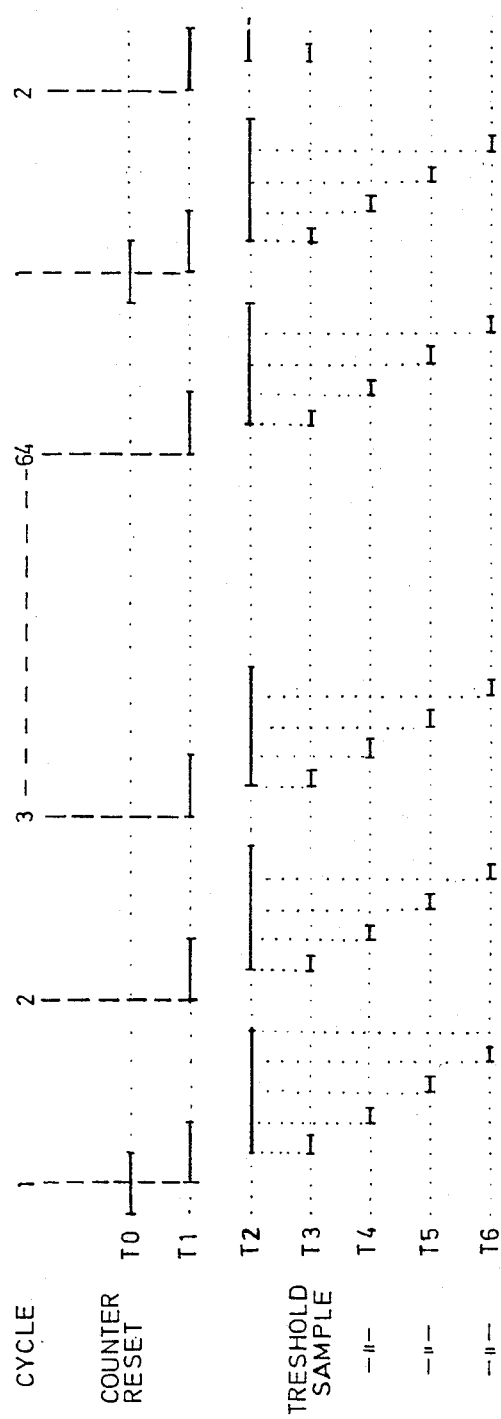
FIG. 4 discloses a timing diagram for signals used in the circuit of FIG. 3.

The operation of the circuit in FIG. 3 for time multiplex mode will now be described in connection with the timing diagram of FIG. 4 showing a four channel time multiplex system.

According to FIG. 4 the operation starts with a counter reset timing signal T0, which will reset the counter 42 at the beginning of a cycle 1. A timing signal T1 will then gate a video signal through the pulse shaper 11 as previously described. During the timing period T2 the sample and hold circuit 14 will hold the sampled video signal at the input 18 of the comparator 25. The counter 42 is stepped a first step from zero to one at time T1 and at time T2 the output from the counter 42, i.e. the value 1, is transferred over the output 43 to the decoder 41.

The purpose of the decoder 41 is to control switches 264-31' and hence the resistors 26-31 for adjusting the threshold value at the input 24 of the comparator 25.

The resistors 26-31 have been marked with the weighting values 32-1, which schematically indicate that the resistor 26, when switched into the circuit by the transistor 26', lowers the threshold value at the point 24 by 32 steps. This is indicated in FIG. 2 as a potential drop from point 211 of the maximum threshold level 105 to the point 110. Similarly the resistor 31 when switched decreases the threshold value from the maximum level 105 by only one step.

At threshold sample time T3 of cycle 1 in FIG. 4, the decoder 41 decodes the counter value 1 into a threshold step value 31. This means that the decoder 41 switches on the transistors 27′–31′ which lowers the threshold value at the point 24 from the point 211 in FIG. 2 to the point 111 on the threshold curve V3.

At time T4 of the same cycle 1 an input signal T4 is fed into the decoder 41. The input signal T4 is decoded in the decoder 41 as a threshold step value 8. This value adds to the previously loaded step value 31 and hence the decoder 41 will output a value 39. This means that the transistors 26′, 29′, 30′ and 31′ will be switched on. In FIG. 2, the threshold value drops from the point 111 on V3 to the point 121 on the curve V4.

At threshold sample time T5 in the same cycle 1 a T5 signal is fed into the decoder 41. This T5 signal is decoded in the decoder 41 as a threshold step value 16. This step value is added to the previous step value 31 and hence the decoder 41 will output the value 47 during the threshold sample time T5 in the cycle 1. This means that the transistors 26′, 28′, 29′, 30′ and 31′ will be activated. In FIG. 2, the threshold value will drop from the point 121 on V4 to the point 122 on V5.

At sample time T6 the input signal T6 to the decoder 41 will be decoded as a step value 24 and the output from the decoder 41 will be 31+24=55. This means that the transistors 26′, 27′, 29′, 30′ and 31′ will be switched and the threshold value in FIG. 2 drops from the point 122 to the point 123.

In cycle 2 of FIG. 4, the counter 42 will be stepped at T1 time from the value 1 to the counter value 2. The counter value 2 will be transferred over the line 43 at T2 time to the decoder 41. The counter value 2 will be decoded in the decoder 41 as a threshold step value 30 and hence the decoder 41 will output the threshold step value 30 during the sample time T3. This means that the transistors 27′–30′ will be switched on. It can be seen in FIG. 2 and in FIG. 4 that when the time T2 in cycle 1 goes down and before the T2 time and time T3 in cycle 2 go up, the output from the decoder 41 is zero and the threshold at point 24 in FIG. 3 will momentanously increase to the point 212 in FIG. 2. At time T3 in cycle 2 the threshold will drop thirty steps from the point 212 to the point 112 on V3.

During the cycle 2 on time T4 the threshold will drop from the point 112 on V3 to the point 131 on V4, in T5 time from the point 131 to the point 132 and in time T6 from the point 132 to the point 133 on V6, in the same manner as has been explained for the cycle 1.

In cycle 3 the counter 42 will be stepped on time T1 from the value 2 to the value 3, which will be decoded in the decoder 41 as an output value 29. This output value will be increased with values 8, 16, 24 for time periods T4, T5 and T6 in a similar way as has been explained for the cycle 1. The threshold value at point 113 on V3 will hence drop for time T4 to V4, for time T5 to V5 and for time T6 to V6 as has been explained previously.

The operation as described will continue cycle after cycle until the counter 42 reaches the value 32. The counter value 32 will be decoded in the decoder 41 as a threshold step value zero. The next counter value 33 will be decoded as a step value 1, the next counter value 34 as a step value 2 and so on until the counter value 64 which will be decoded as a step value 32.

When the counter 42 reaches the value 64, one scan of the code line on the document has been completed. The first cycle of the next scan starts with a T0 signal which resets the counter 42. The operation of the next scan is then proceeding in the same manner as has been described for the first scan.

According to the operation described the threshold signal input 24 to the video comparator 25 is a time multiplex signal with four channels. It is obvious that any other number of channels can be used without departing from the inventive concept.

At time T3 of any cycle the gate 45 will open and the EXCLUSIVE-OR circuit 62 will initiate a DMA memory cycle when the output level of the comparator 25 changes from one to zero or from zero to one as compared to the previous cycle. The DMA circuit 80 will interrupt the processor 81 and will transfer the contents of the counter 42 into a storage modul S3 of a buffer 84 in the RAM 83.

At sample time T4 the gate 46 will open and its output 55 will be fed into a one bit delay circuit 51 and also to an EXCLUSIVE-OR circuit 63. The EXCLUSIVE-OR circuit 63, having a second input 59, will provide an output on line 72 if the bit value for the present cycle differs from the bit value at time T4 for the previous cycle. When the EXCLUSIVE-OR circuit 63 provides an output to the DMA cycle 80, the memory cycle will occur at time T4 transferring the contents of the counter 42 to the memory module S4. Similarly the gate circuit 47, attached over an output 56 to the bit delay circuit 52 and the EXCLUSIVE-OR circuit 64 with a second input 60, will initiate a DMA memory cycle over the output 73 at sample time T5 if the output of the comparator circuit 25 changes state between two cycles at time T5. The contents of the counter 42 will then be transferred to the memory module S5. Similarly the gate circuit 48 having an output 57, the bit delay circuit 53 with an output 61 and the EXCLUSIVE-OR circuit 65 are used to control the DMA circuit 80 via the line 74 for the sample time T6, whereby the counter 42 contents will be transferred to the memory module S6.

The input video signal for a scanning line 9 in FIG. 1 is shown by curve 102 in FIG. 2. This curve will indicate a black video signal around the cycle 21 and the cycle 41. The signal curve 102 crosses the threshold curve V3 at scan cycle points 21, 23, 41 and 43. This means that the storage module S3, corresponding to the threshold value V3, will store the counter values 21, 23, 41, 43. The storage module S4 will store the counter values for the threshold V4 as follows. 21, 22, 41, 42. The storage modules S5 and S6 will store no counter values.

It can be seen that the information stored in the module S3 is the best one for recognizing OCR characters with a threshold value V3. The information stored in the storage module S4 is critical and might or might not detect a black area for a scanning line of an OCR character.

When the line 9′ is scanned for the E13B font in FIG. 1, the result will be shown as a curve 101 in FIG. 2. The information stored in the storage module S3 for the threshold value V3 will be as follows: 20, 23, 32. The module S4 for the threshold value V4 will store the following information: 20, 23, 33, 48, 54, 59. The storage module S5 for the threshold value V5 will store the following counter values. 20, 23, 40, 43. The module S6 will store no counter values.

It can be seen that only the storage module S5 storing information according to the threshold value V5 will provide the correct information for a later E13B character font recognition. The drop of the video signal for the E13B curve 101 at about the cycle time 31 and 32 is due to the noise caused by the stamp 7 on the document according to FIG. 1.

The processor 81 recognizes characters using the compressed data in the storage modules S3–S6 as basic data. This recognition procedure starts from data stored in the module S3 for OCR font characters. This recognition is performed by expanding the compressed data from S3 into a recognition storage 85. The procedure for expanding compressed video data and the recognition of characters from expanded data is more fully described in the aforementioned Edlund et al patent application.

Recognized characters are transferred to an output buffer 86 for further transfer to a user unit or to the host 82. It should be noted that the loading of the storage modules S3–S6 under the control of the DMA circuit 80 is asynchronous as compared to the character recognition process performed by the processor 81. The delay between the scanning and storing operation as compared to the recognition operation depends on circumstances such as the workload for the processor 81, the number of cycles needed for the recognition of certain characters and the influence of noise, etc., for the recognition operation. According to FIG. 1, it can be seen that the code line field 5 including the separating character will be scanned after the OCR code field 6. The scanning then continues for the E13B code line 4 and several characters might have been scanned before the separating character X in the field 5 has been recognized by the processor 81.

When the processor 81 recognizes the separating character X, it will switch over the recognition operation from the storage module S3 to the storage module S5 storing data based upon the threshold level V5. The recognition of the E13B characters will then continue in the recognition storage 85 in a similar manner as for the data stored in the storage module S3.

The recognition of OCR characters using stored master data and video data from S3 is performed in the area 85 according to any known recognition method. Similarly the recognition of E13B characters using other stored master data and video data from S5 is performed.

It should be noted that the loading of data into the storage modules S3–S6 should also contain scan identification information. This information is preferably stored into the modules during the time T0 for each scan. This information is then used by processor 81 to find the right starting position in a new storage module, i.e., in the storage module S5 when the operation switches over from the old storage module, i.e., the storage module S3.

A scan counter 92 will be incremented by one for each scan at time T0. An AND circuit 93 is used to start a DMA cycle at time T1 for the first cycle in each scan. This DMA cycle will store the content of the scan counter 92 into all modules S3–S6 in order to provide the necessary scan sequence information. When the processor 81 switches the recognition operation from one storage module, such as the module S3 to another storage module, such as S5, the processor 81 will compare the scan sequence information in these both storage modules in order to start the recognition in the new module at the same scan position as the recognition was ended in the previous module.

The decoder 41 has not been described in detail, however, it is obvious that any type of well known decoder can be used. According to a preferred embodiment the decoder 41 is of random access memory (RAM) type. Such decoder is addressed by the input signals from the counter 42 and from the clock circuit 44. The address data is then used to control the switching units 26'–31'.

The present invention has been described in connection with a preferred embodiment according to FIG. 3. It is, however, obvious for a man skilled in the art that many other circuit combinations can be used without departing from the scope of the invention. Hence, it is possible to use a plurality of video detector circuits 10–34, one circuit for each threshold level V3–V6. The time multiplex gate circuits 45–48 should then be located between the EXCLUSIVE-OR circuits 62–65 and the DMA circuit 80. It is also possible to use a plurality of DMA circuits 80, one for each threshold level V3–V6. The time multiplex gate circuits 45–48 should then be located in the output circuits for the corresponding DMA circuits 80. Such a modification would transfer the time multiplex control from the threshold circuits to the input circuits for the RAM 83. The drawback for such a modified circuit would be the need of a plurality of threshold circuits and DMA circuits. The gain of such a modification, however, would be some increase of signal operation time for the circuits concerned.

According to still another embodiment of the invention the decoder 41 is modified to provide threshold level curves of different shape. As an example a first threshold curve V3 has a rounded shape as shown in FIG. 2. A second threshold curve V4 has a more flat shape, a third threshold curve V5 might disclose an unsymmetric shape and the fourth curve V6 discloses still another shape. Such an arrangement requires four sections in the decoder 41, one for each threshold profile. The clock signals T3–T6 are then used to select corresponding sections in time multiplex.

The processor 81 is preferably used to originally load threshold profile data into the various sections of the RAM decoder 41.

I claim:

1. A character recognition system for an optical document reader for recognizing two types of characters in a single line of characters, the system comprising:
   means for generating and detecting a video signal, said video signal detecting means having a threshold input;
   means for generating a threshold signal including signal level controlling circuits for generating a plurality of threshold signals in time multiplex at the threshold input of the video signal detecting means;
   means for comparing signals for video signal detection;
   means for storing signals including means for generating one time multiplex channel for each threshold signal and having a plurality of logic circuits incorporated in a program logic array (PLA) circuit including a clock circuit and a cycle counter driven by the clock and counting operating cycles during one line scan, the cycle time of one operating cycle covering one time period of each time multiplex channel, said logic circuits operating in time multiplex mode and having inputs connected to the output of the video signal detector and having outputs connected to a direct memory access (DMA) device storing detected video data in time multiplex into a plurality of storage modules, one module for each threshold signal; and means for processing signals for recognizing character data using video data detected with a first threshold signal and stored in a first module until a separating character is detected and subsequently recognizing character data using video data detected with a second threshold signal and stored in a second module.

2. System according to claim 1, wherein the content of said cycle counter is transferred as video information to a storage module during a direct memory access storage cycle.

3. System according to claim 1, wherein the content of said cycle counter is cyclically transferred to a decoder in said threshold signal level controlling circuits, said decoder having as additional inputs clock signals defining time multiplex channels and wherein the output of the decoder is attached to threshold level adjusting means.

* * * * *